United States Patent [19]

Kane

[11] Patent Number: 4,789,159

[45] Date of Patent: Dec. 6, 1988

[54] APPARATUS FOR ASSISTING A GOLFER TO KEEP THE GOLFER'S HEAD LEVEL WITH THE BALL AND STILL WHILE THE GOLFER IS IN THE PROCESS OF HITTING THE BALL

[76] Inventor: Thomas J. Kane, 2168 W. Ridge Rd., Los Angeles, Calif. 90048

[21] Appl. No.: 84,455

[22] Filed: Aug. 12, 1987

[51] Int. Cl.⁴ ............................................. A63B 69/36
[52] U.S. Cl. ................................ 273/183 B; 351/118; 33/370; 33/373; 33/508; 273/183 E
[58] Field of Search ................. 351/118, 156; 33/370, 33/373, 508; 273/183 B, 183 E

[56] References Cited

U.S. PATENT DOCUMENTS

| | | | |
|---|---|---|---|
| 2,389,428 | 11/1945 | Glasser | 351/118 |
| 3,264,002 | 8/1966 | Palumbo | 273/183 B |
| 3,487,549 | 1/1970 | Engesser | 273/183 B |
| 3,871,104 | 3/1975 | Underhill | 33/370 |
| 4,479,703 | 10/1984 | Enghofer | 351/118 |
| 4,531,743 | 7/1985 | Lott | 273/183 B |
| 4,696,111 | 9/1987 | Gardner | 273/183 E |

*Primary Examiner*—William L. Freeh
*Attorney, Agent, or Firm*—Thomas I. Rozsa

[57] ABSTRACT

An apparatus for assisting a golfer to keep the golfer's head level with the ball and still while the golfer is in the process of hitting the ball, comprising a pair of frame members which rest on the golfer's ears or include attaching means which permit the frames to be attached to an article worn on the golfer's head such as a hat or headband and a center bridge member adjoining the two frames and including a level means, wherein the apparatus is worn such that the level means rests in front of the golfer and just above or just below the line of sight between the golfer's eyes and the golf ball.

12 Claims, 1 Drawing Sheet

APPARATUS FOR ASSISTING A GOLFER TO KEEP THE GOLFER'S HEAD LEVEL WITH THE BALL AND STILL WHILE THE GOLFER IS IN THE PROCESS OF HITTING THE BALL

BACKGROUND OF THE INVENTION

1. Field of the Invention

The present invention relates to the field of supplementary apparatus used by golfers to improve their game. One critical element of a golfer's game is maintaining a proper form during the swing. The present invention relates to the field of training and use apparatus which assist a golfer to maintain his/her head level and not move his/her head during the golf swing.

2. Description of the Prior Art

It is well known that in the game of golf, proper form during a golf swing is extremely important in maintaining and/or improving one's skill in the game. It is well known that proper stance during a golf stroke is very important to determining the distance and/or accuracy of the flight of the ball upon contact being made between the club and the ball.

One of the most important elements during the golf swing is the position of the golfer's head. It is extremely important that the golfer's head be level and that the head remain substantially constant in space, beginning with the golfer's address of the ball, and progressing through the backswing and downswing to the moment of impact. It is critically important to the success of the stroke that the golfer's head movement be held to a minimum. One reason for this requirement is that proper balance is necessary for a successful stroke. Fluid-filled chambers in the inner ear contain minute, hairlike sensors. As the head moves, the fluids shift, bending the hairs and stimulating nerve impulses; any change in position is transmitted to the brain. If the golfer's head moves, the golfer will not be in perfect balance as he/she hits the ball, resulting in less than an optimum shot.

Since improper head movement is a major source of a beginning golfer's troubles in playing golf, golf trainers spend a lot of time in training the golfer to maintain his/her head level with the ball and not move it during the golf stroke. As a result, a number of devices have been developed to aid in this teaching process. A major deficiency in the prior art devices is that all of the known apparatus are extremely cumbersome. Examples of training devices which teach the golfer to maintain his/her head stationary are disclosed in the following United States Patents:

1. U.S. Pat. No. 3,729,200 issued to Hines et al. in 1973 for "Golfer's Head Movement Indicator" ("'200 Patent"); and 2. U.S. Pat. No. 3,740,051 issued to Cross in 1973 for "Golfer's Practice Head Position Guide" ("'051 Patent").

The '200 Patent discloses an apparatus wherein a string is attached at one end to the golfer's hat and at its other end to a button resting on the golf ball. The '051 Patent discloses a cumbersome apparatus including a pole, an extension bar extending from the pole and toward the golfer, and a guide ring encircling the golfer's head. These patents illustrate problems with prior art devices. First, the devices of the prior art are much too cumbersome to be easily moved. Therefore, it is difficult to use the devices on a golf course. Second, the devices provide obstructions for the golfer. In the case of the '200 Patent, the golf club could easily become entangled in the string between the golfer's hat and the ball. In the case of the '051 Patent, the supporting pole could interfere with the golf club. Third, the devices really do not provide any accurate means by which the golfer can determine whether or not he has kept his/her head level and still during the golf stroke.

Therefore, a significant need exists for an apparatus for assisting a golfer to keep the golfer's head level with the ball and still while the golfer is in the process of hitting the ball.

SUMMARY OF THE PRESENT INVENTION

The present invention is a simple, non-cumbersome, easily transportable, and easily usable apparatus for assisting a golfer to keep the golfer's head level with the ball and still while the golfer is in the process of hitting the ball.

It has been discovered, according to the present invention, that an apparatus comprising a head frame including a bridge containing a level means can be worn by a golfer in a manner which permits the level means to lie just above the line of sight between the golfer's eyes and the golf ball. As a result the golfer can adjust the angle of his head with the level indicator in the level means such that it is level with the golf ball and further can at all times during the golf stroke see the level indicator in the level means to be sure that he/she is maintaining his/her head still during the stroke.

It has further been discovered, according to the present invention, that the level means can be a visible liquid filled transparent chamber including a bubble therein, such as a carpenter's level.

It has additionally discovered that the head frame of the present invention may comprise a pair of frame members comparable to the temples of an eyeglass frame, which are joined by front and rear bridges, with the front bridge including the level means. The frame members can be supported on the wearer's head and rest over a lobe of each ear respectively so that the frame can be adjusted up or down to bring the front bridge carrying the level means to a location just above the line of sight between the golfer's eye and the golf ball.

It has also been discovered that in an alternative embodiment of the present invention, the head frame comprises a pair of frame members and only a frame joining bridge carrying the level means. The rear portion of each frame members includes an attaching means such as alligator clips which permit each frame to be attached to the golfer's hat or a headband. The frame members can be supported on the wearer's hat or headband and may also rest over the golfer's ears so that the frame can be adjusted up or down to bring the front bridge carrying the level means to a location just above the line of sight between the golfer's eye and the golf ball.

It has additionally been discovered that the frame members of the present invention may include one or a multiplicity of telescoping members to enable the distance of the front bridge carrying the level means from the golfer's head to be adjusted according to the size and shape of the golfer's head and according to the height of the golfer and the angle of his/her head in relation to the golf ball during a stroke.

It is therefore an object of the present invention to provide a simple, non-cumbersome, easily transportable, and easily usable apparatus for assisting a golfer to keep the golfer's head level with the ball and still while the golfer is in the process of hitting the ball.

It is a further object of the present invention to provide a simple apparatus which can be easily worn on the golfer's ears or supported by the golfer's hat, headband, etc.

It is another object of the present invention to provide a simple apparatus which can be adjusted up and down and front and back to precisely align the leveling means to just above or just below the line of sight between the golfer's eyes and golf ball during the stroke, and can be adjusted for each golfer, regardless of the size of his/her head or height.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 2:
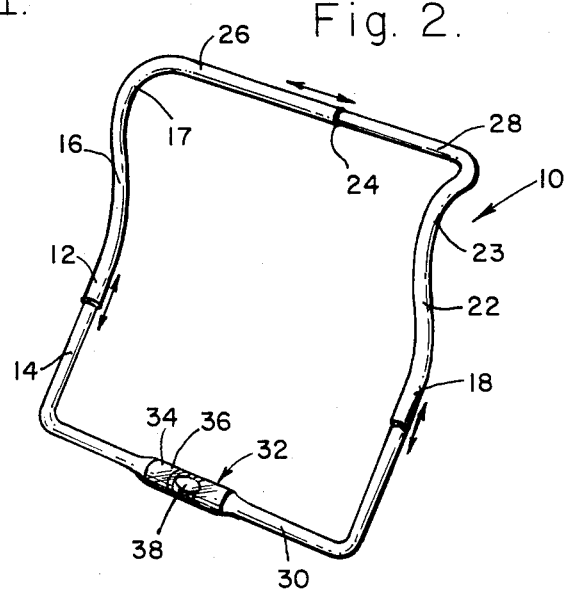
FIG. 2 is a perspective view of one embodiment of the present invention.

Referring particular to FIG. 2, there is shown one embodiment of the present invention apparatus for assisting a golfer to keep the golfer's head level with the ball and still while the golfer is in the process of hitting the ball (hereinafter called "head adjustment apparatus"). The head adjustment apparatus 10 comprises a pair of frame members 12 and 18 interconnected by a pair of bridge members 24 and 30 respectively. First frame member 12 is comprised of two sections, a front section 14 and a rear section 16, which fit telescopically together. Second frame member 18 is comprised of two sections, a front section 20 and a rear section 22, which fit telescopically together. Rear sections 16 and 22 are connected by rear bridge member 24. Rear bridge member 24 is comprised of two sections, 26 and 28 which fit telescopically together. In the embodiment shown in FIG. 2, Sections 16 and 26 are of one piece construction and are approximately perpendicular to each other and sections 22 and 28 are of one piece construction and are approximately perpendicular to each other. In the illustration shown in FIG. 2, front sections 14 and 20 and front bridge member 30 are of one piece construction. Front bridge 30 further comprises a level means 32 located at the approximate center of front bridge 30. Level means 32 may comprise a transparent chamber 34 which is mostly filled with liquid 36 and has enough air remaining to form a bubble 38. One embodiment of the telescoping interfit between sections is shown in FIG. 3 wherein front section 20 slideably fits into rear section 22 with a press fit so that the two sections will remain in a given position relative to each other until one or the other is physically moved.

Figure 3:
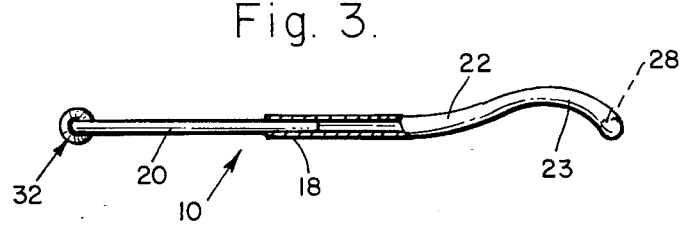
FIG. 3 is a side elevational view of the present invention as illustrated in FIG. 2, looking from the right side.

The embodiment illustrated in FIGS. 2 and 3 shows the frame members 12 and 20 resembling the temples of spectacles and includes a curved portion 17 and 23 respectively to fit over and supported by the golfer's ears. It is also within the spirit and scope of the present invention for the frame members 12 and 20 to be completely straight.

Figure 1:
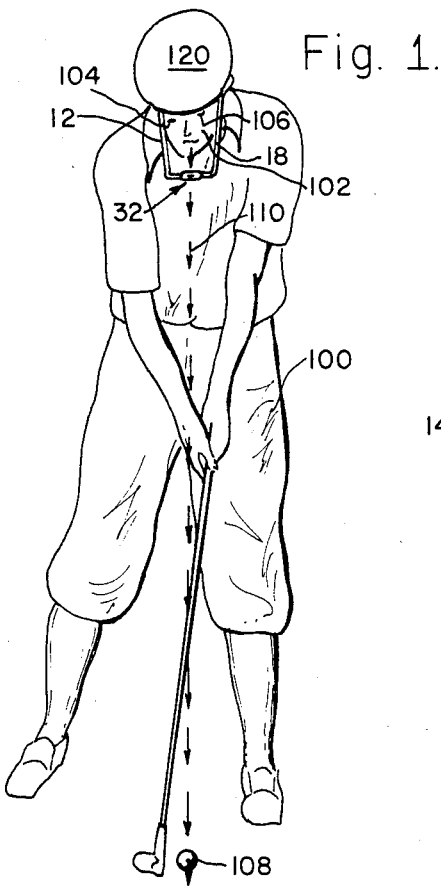
FIG. 1 is a perspective view of the present invention worn by a golfer and in use during a golf stroke.

The head adjustment apparatus 10 is shown in use in FIG. 1. The golfer 100 places the head adjustment apparatus over his head such that the frame members 12 and 18 are supported on his ears. The head adjustment apparatus is adjusted through the telescoping fits of frame members 12 and 18 and the telescoping fit of rear bridge member 24 in order to properly fit on the golfer's head 102 and further lie such that the level means 32 is either directly above or directly below (as shown in FIG. 1) the line of sight 110 between the golfer's eyes 104 and 106 and the golf ball 108. Through use of the present invention head adjustment apparatus, the golfer 100 can keep his head 102 level with the golf ball 108 and can check to see that he/she had retained his/her head still during the golf stroke. Since the golfer's eyes 104 and 106 can focus on the level means 32 as well as the golf ball 108 during the entire time of the golf stroke, the golfer can easily see that his head is level when the stroke begins and through looking at the bubble 38 in the level means 32 can see if it moves during the time of the golf stroke.

Figure 4:
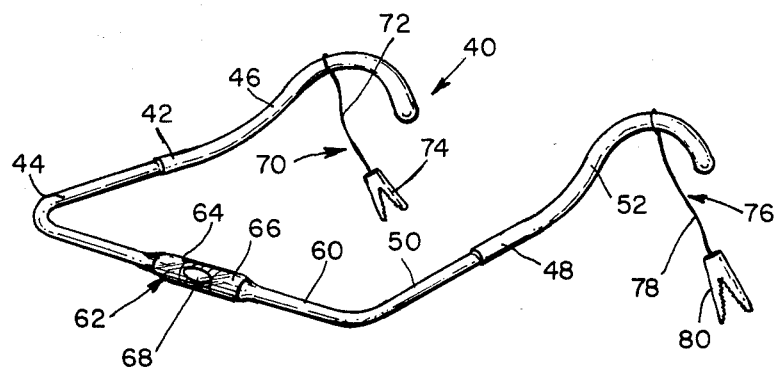
FIG. 4 is a perspective view of an alternative embodiment of the present invention.

An alternative embodiment of the present invention head adjustment apparatus 40 is shown in FIG. 4. The alternative embodiment head adjustment apparatus 40 comprises a pair of frame members 42 and 48 interconnected by a front bridge member 60. First frame member 42 is comprised of two sections, a front section 44 and a rear section 46, which fit telescopically together. Second frame member 48 is comprised of two sections, a front section 50 and a rear section 52, which fit telescopically together. The two frame members 42 and 48 are connected together by front bridge member 60. In the illustration shown in FIG. 4, front sections 44 and 50 and front bridge member 60 are of one piece construction. Front bridge 60 further comprises a level means 62 located at the approximate center of front bridge 60. Level means 62 may comprise a transparent chamber 64 which is mostly filled with liquid 66 and has enough air remaining to form a bubble 68. The rear sections 46 and 52 of the frame members include attaching means 70 and 76 respectively. In the embodiment shown in FIG. 4, attaching means 70 further comprises a chain or string 72 attached at one end to rear section 46 and attached at its other end to a clip 74. Similarly, attaching means 76 further comprises a chain or string 78 attached at one end to rear section 52 and attached at its other end to a clip 80. Instead of being worn on the golfer's ears, in the alternative embodiment the head adjustment apparatus 40 is attached by the attaching means 70 and 76 to the golfer's hat 120 or to the edges of a headband or eyeshade. This alternative embodiment is operated identically to the first embodiment described.

The frame members and bridge(s) can be made of any suitable material such as plastic, wood or metal. The level means can be any suitable level device such as a carpenter's level and can be included in the front bridge member by either being integrally formed therein or fasten to the front bridge member at its center.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A apparatus for assisting a golfer to keep the golfer's head level with a golf ball and still while the golfer is in the process of hitting the golf ball, comprising:
   a. a first frame member have a rear end and a front end;
   b. a second frame member having a rear end and a front end, and aligned parallel to and spaced apart from said first frame member;
   c. said first and second frame members connected at their rear ends by a rear bridge member set approximately perpendicular to the rear end of the first and second frame members;
   d. said rear bridge member further comprising a pair of sections which are telescopically and movably interconnected;
   e. said first and second frame members connected at their front ends by a front bridge member set approximately perpendicular to the front end of the first and second frame members; and
   f. said front bridge member further comprising a level means at approximately its center;
   g. whereby said first frame member can be placed on one of the golfer's ears and said second frame member can be placed on the second ear of the golfer such that said level means is located just above or just below the line of sight between the golfer's eyes and the golf ball.

2. The invention as defined in claim 1 wherein said first frame member comprises a pair of sections which are telescopically and movably interconnected and said second frame member comprises a pair of sections which are telescopically and movably interconnected.

3. The invention as defined in claim 1 wherein said first frame member and said second frame member are each in the shape of temples on a pair of spectacles.

4. A apparatus for assisting a golfer to keep the golfer's head level with a golf ball and still while the golfer is in the process of hitting the golf ball, comprising:
   a. a first frame member have a rear end and a front end;
   b. a second frame member having a rear end and a front end, and aligned parallel to and spaced apart from said first frame member;
   c. said first and second frame members connected at their rear ends by a rear bridge member set approximately perpendicular to the rear end of the first and second frame members;
   d. said first and second frame members connected at their front ends by a front bridge member set approximately perpendicular to the front end of the first and second frame members;
   e. said front bridge member further comprising a level means at approximately its center; and
   f. said level means further comprising a transparent chamber mostly filled with liquid and has enough air remaining to form a bubble, and is a carpenter's level;
   g. whereby said first frame member can be placed on one of the golfer's ears and said second frame member can be placed on the second ear of the golfer such that said level means is located just above or just below the line of sight between the golfer's eyes and the golf ball.

5. The invention as defined in claim 4 wherein said first frame member comprises a pair of sections which are telescopically and movably interconnected and said second frame member comprises a pair of sections which are telescopically and movably interconnected.

6. The invention as defined in claim 4 wherein said first frame member and said second frame member are each in the shape of temples on a pair of spectacles.

7. A apparatus for assisting a golfer to keep the golfer's head level with a golf ball and still while the golfer is in the process of hitting the golf ball, comprising:
   a. a first frame member have a rear end and a front end;
   b. a second frame member having a rear end and a front end, and aligned parallel to and spaced apart from said first frame member;
   c. said first and second frame members connected at their front ends by a front bridge member set approximately perpendicular to the front end of the first and second frame members;
   d. said front bridge member further comprising a level means at approximately its center;
   e. a first attaching means attached to said first frame member adjacent its rear end;
   f. a second attaching means attached to said second frame member adjacent its rear end; and
   g. said first attaching means includes a chain attached at one end to said first frame member and attached at its other end to a clip and said second attaching means includes a chain attached at one end to said second frame member and attached at its other end to a clip;
   h. whereby said first and second attaching means can be attached by their respective clips to an article worn on the golfer's head such that said first frame member can be worn over one of the golfer's ears and said second frame member can be worn over the second ear of the golfer such that said level means is located just above or just below the line of sight between the golfer's eyes and the golf ball.

8. The invention as defined in claim 7 wherein said first frame member comprises a pair of sections which are telescopically and movably interconnected and said second frame member comprises a pair of sections which are telescopically and movably interconnected.

9. The invention as defined in claim 7 wherein said first frame member and said second frame member are each in the shape of temples on a pair of spectacles.

10. A apparatus for assisting a golfer to keep the golfer's head level with a golf ball and still while the golfer is in the process of hitting the golf ball, comprising:
 a. a first frame member have a rear end and a front end;
 b. a second frame member having a rear end and a front end, and aligned parallel to and spaced apart from said first frame member;
 c. said first and second frame members connected at their front ends by a front bridge member set approximately perpendicular to the front end of the first and second frame members;
 d. said front bridge member further comprising a level means at approximately its center;
 e. said level means further comprising a transparent chamber mostly filled with liquid and has enough air remaining to form a bubble, and is a carpenter's level;
 f. a first attaching means attached to said first frame member adjacent its rear end; and
 g. a second attaching means attached to said second frame member adjacent its rear end;
 h. whereby said first and second attaching means can be attached to an article worn on the golfer's head such that said first frame member can be worn over one of the golfer's ears and said second frame member can be worn over the second ear of the golfer such that said level means is located just above or just below the line of sight between the golfer's eyes and the golf ball.

11. The invention as defined in claim 10 wherein said first frame member comprises a pair of sections which are telescopically and movably interconnected and said second frame member comprises a pair of sections which are telescopically and movably interconnected.

12. The invention as defined in claim 10 wherein said first frame member and said second frame member are each in the shape of temples on a pair of spectacles.

* * * * *